(12) United States Patent
Bent et al.

(10) Patent No.: US 9,703,788 B1
(45) Date of Patent: Jul. 11, 2017

(54) DISTRIBUTED METADATA IN A HIGH PERFORMANCE COMPUTING ENVIRONMENT

(71) Applicant: EMC Corporation, Hopkinton, MA (US)

(72) Inventors: John M. Bent, Los Alamos, NM (US); Sorin Faibish, Newton, MA (US); Zhenhua Zhang, Beijing (CN); Xuezhao Liu, Beijing (CN); Haiying Tang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 345 days.

(21) Appl. No.: 14/230,800

(22) Filed: Mar. 31, 2014

(51) Int. Cl.
*G06F 17/30* (2006.01)

(52) U.S. Cl.
CPC .... *G06F 17/30094* (2013.01); *G06F 17/3056* (2013.01); *G06F 17/30194* (2013.01); *G06F 17/30445* (2013.01); *G06F 17/30563* (2013.01)

(58) Field of Classification Search
CPC ........... G06F 17/30094; G06F 17/3056; G06F 17/30445; G06F 17/30194; G06F 17/30563
USPC ........................................................ 707/812
See application file for complete search history.

(56) References Cited

U.S. PATENT DOCUMENTS

| | | | |
|---|---|---|---|
| 7,523,130 B1 * | 4/2009 | Meadway | G06F 17/30575 |
| 2009/0319621 A1 * | 12/2009 | Barsness | G06F 11/0724 |
| | | | 709/206 |
| 2011/0066591 A1 * | 3/2011 | Moyne | G06F 17/30486 |
| | | | 707/610 |
| 2011/0302151 A1 * | 12/2011 | Abadi | G06F 17/30445 |
| | | | 707/714 |
| 2012/0284317 A1 * | 11/2012 | Dalton | G06F 17/301 |
| | | | 707/827 |
| 2013/0227194 A1 * | 8/2013 | Kannan | G06F 15/7821 |
| | | | 711/103 |

(Continued)

FOREIGN PATENT DOCUMENTS

WO    WO 2015200503 A1 * 12/2015    ......... G06F 17/3033

OTHER PUBLICATIONS

"Multi-dimensional Hashed Indexed Metadata Middleware (MDHIM) Project" by James Nunez, May 10, 2012, 42 pages.*

*Primary Examiner* — Kris Mackes
*Assistant Examiner* — Tiffany Bui
(74) *Attorney, Agent, or Firm* — Krishnendu Gupta; Konrad R. Lee

(57) ABSTRACT

A computer-executable method, system, and computer program product for managing meta-data in a distributed storage system, wherein the distributed storage system includes one or more burst buffers enabled to operate with a distributed key-value store, the co computer-executable method, system, and computer program product comprising receiving a request for meta-data associated with a block of data stored in a first burst buffer of the one or more burst buffers in the distributed storage system, wherein the meta data is associated with a key-value, determining which of the one or more burst buffers stores the requested metadata, and upon determination that a first burst buffer of the one or more burst buffers stores the requested metadata, locating the key-value in a portion of the distributed key-value store accessible from the first burst buffer.

9 Claims, 16 Drawing Sheets

(56) References Cited

U.S. PATENT DOCUMENTS

| | | | | |
|---|---|---|---|---|
| 2013/0275381 | A1* | 10/2013 | De Schrijvr | G06F 11/1076 707/652 |
| 2013/0332608 | A1* | 12/2013 | Shiga | G06F 9/5088 709/226 |
| 2014/0108707 | A1* | 4/2014 | Nowoczynski | G06F 12/0246 711/103 |
| 2014/0279964 | A1* | 9/2014 | Velury | G06F 17/30153 707/693 |
| 2014/0280375 | A1* | 9/2014 | Rawson | G06F 17/30289 707/803 |
| 2014/0351300 | A1* | 11/2014 | Uppu | H04L 12/6418 707/827 |
| 2016/0034507 | A1* | 2/2016 | Aron | G06F 17/30327 707/722 |

\* cited by examiner

DISTRIBUTED METADATA IN A HIGH PERFORMANCE COMPUTING ENVIRONMENT

STATEMENT OF GOVERNMENT RIGHTS

This invention was made under a Cooperative Research and Development Agreement between EMC Corporation and Los Alamos National Security, LLC. The United States government has rights in this invention pursuant to Contract No. DE-AC52-06NA25396 between the United States Department of Energy and Los Alamos National Security, LLC for the operation of Los Alamos National Laboratory.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A computer-executable method, system, and computer program product for managing meta-data in a distributed storage system, wherein the distributed storage system includes one or more burst buffers enabled to operate with a distributed key-value store, the com computer-executable method, system, and computer program product comprising receiving a request for meta-data associated with a block of data stored in a first burst buffer of the one or more burst buffers in the distributed storage system, wherein the meta data is associated with a key-value, determining which of the one or more burst buffers stores the requested metadata, and upon determination that a first burst buffer of the one or more burst buffers stores the requested metadata, locating the key-value in a portion of the distributed key-value store accessible from the first burst buffer.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
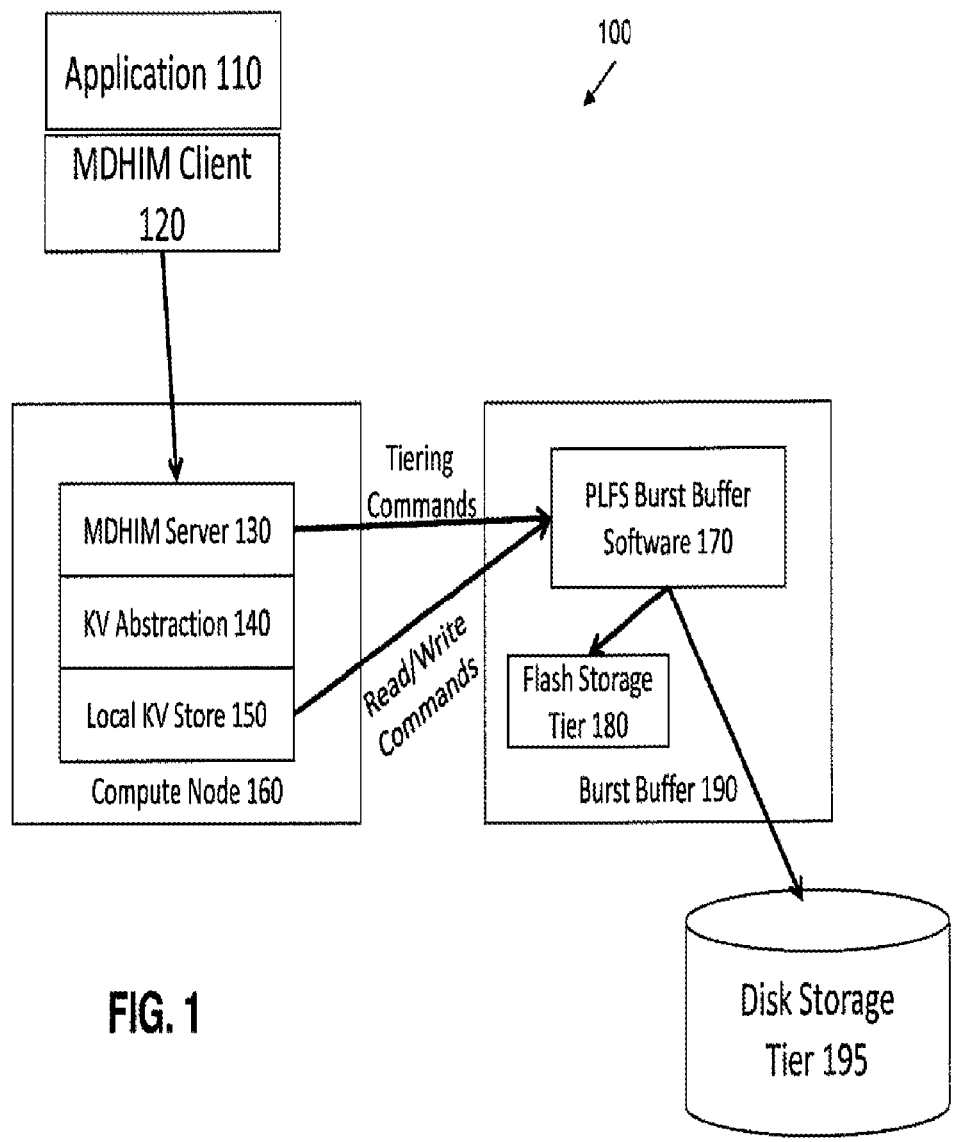
FIG. 1 illustrates an exemplary partitioned key-value store incorporating aspects of the invention.

Traditionally, in High Performance Computing (HPC) environments, data storage systems have been dealing with the increasing amount of data being processed. Typically, along with increased amounts of data, HPC environments manage an ever increasing amount of metadata to efficiently manage the increased amount of data being stored and processed on data storage system. Generally, metadata is collected into a single location and is unwieldy to manage, search through, and read/write from when dealing with a large amount of metadata. Conventionally, being able to improve performance of metadata storage in HPC environments may be beneficial to the performance of a data storage system.

In many embodiments, the current disclosure may enable creation of a HPC environment which may include one or more computing nodes in communication with one or more burst buffers and data storage arrays. In various embodiments, the current disclosure may enable a HPC environment to distribute data and/or metadata throughout an HPC environment on one or more data storage system. In certain embodiments, a burst buffer appliance may include flash storage, a data management module, a distributed Key-Value (KV) store, and may be in communication with one or more data storage arrays. In some embodiments, a data management module may be enabled to manage received data on a distributed level. In many embodiments, a data management module may be enabled to communicate with one or more other data management modules on other burst buffers to coordinate and/or support coordination of storing of large data sets, sometimes referred to as big data.

In many embodiments, the current disclosure may enable a large data set to be divided into two or more portions of data that may be processed by two or more compute nodes. In various embodiments, each compute node may be in communication with a burst buffer appliance which may be in communication with one or more data storage arrays. In other embodiments, a burst buffer appliance may include a data management module, distributed Key-Value (KV) store, and a fast data storage buffer. In some embodiments, a fast data storage buffer may be flash storage and/or other fast storage device.

In many embodiments, the current disclosure may enable a HPC environment to manage metadata using an MPI-sharded KV store. In various embodiments, the current disclosure may utilize a MPI-sharded KV store, such as a Multidimensional Data Hashing Indexing Middleware (MDHIM). In certain embodiments, the current disclosure may enable a HPC environment to manage data objects, data containers, transactions, events, and/or data storage. In other embodiments, the current disclosure may enable a HPC environment to manage meta-data for data objects, data containers, transactions, events, and/or data storage artifacts. In some embodiments, a data management module may be enabled to manage data and the associated metadata within a HPC environment. In many embodiments, the current disclosure may enable a data management module to distribute and/or retrieve metadata throughout an HPC environment to enable efficient use of resources. In various embodiments, distributed metadata may increase the efficiency of an HPC environment by reducing the amount of processing required to analyze, create, distribute, and/or retrieve metadata.

In many embodiments, a data management module may manage millions or billions of objects, containers, events, and/or transactions in a HPC environment. In various embodiments, a data management module may be enabled to manage and/or synchronize one or more asynchronous events and their queues stored within a HPC environment. In many embodiments, metadata stored may contain information about each object, container, event, and/or transaction, such as where the associated data may be located across a set of burst buffers in the HPC environment. In various embodiments, metadata may contain information related to which portion of secondary storage within the HPC environment data is stored.

In many embodiments, an I/O Dispatcher module may be a data management module which may create metadata about objects, containers, and/or events stored within a data storage system. In various embodiments, an I/O Dispatcher module may be enabled to utilize a distributed metadata KV store, such as MDHIM. In certain embodiments, an I/O Dispatcher module may manage metadata in the form of a list of burst buffers across which each portion of data is stored. In other embodiments, an I/O Dispatcher module may manage metadata in the form of checksum unit size and stripe size for when an object is persisted off a burst buffer. In some embodiments, metadata may include layout information for the data in each respective burst buffer. In many embodiments, metadata may include transactional information about each object, such as in which transaction it may have been created, may have been unlinked, and/or the last offset of each object.

In many embodiments, the HPC Environment may utilize Transactions to manage synchronization and/or coordination of distributed data storage. In various embodiments, each transaction may have an identifier, such transaction Identifier (TID) may enable a data management module to manage data created, deleted, and/or managed within a HPC Environment. In various embodiments, a TID may be included as a parameter to a command sent to the data management module. In certain embodiments, a TID may be sent during a read request to a data management module to ensure multiple reads may be able to view a consistent version of the data. In other embodiments, a write may specify a TID to ensure multiple writes may be applied atomically. In some embodiments, a data management module may not allow a user to read and write using one TID at the same time. In many embodiments, a TID may be a 64 bit value. In other embodiments, the size of a TID may vary depending on the size of the HPC Environment. In various embodiments, a data management module may reserve portions of a TID for internal processing. In some embodiments, portions of a data reserved for internal processing may relate to replica flags and/or other flags marking data within a HPC environment.

In many embodiments, a data management module may retain TID information for metadata stored and/or managed by each respective data management module. In various embodiments, a data management module may retain a lowest_durable_TID which may include the lowest TID which may have been migrated from primary storage to a secondary storage layer. In certain embodiments, a data management module may retain a latest_readable_TID which may be associated with the latest (and/or highest) readable data on a Burst Buffer appliance. In other embodiments, the latest readable data on a burst buffer appliance may not have been migrated to secondary storage and/or underlying data storage arrays. In many embodiments, a data management module may retain a latest_writing_TID which may include the latest (and/or highest) TID which may have started writing.

Multidimensional Data Hashing Indexing Middleware (MDHIM)

Illustrative embodiments of the present invention will be described herein with reference to exemplary partitioned data stores and associated clients, servers, storage arrays and other processing devices. It is to be appreciated, however, that the invention is not restricted to use with the particular illustrative partitioned data stores and device configurations shown. Accordingly, the terms "partitioned data store" and "partitioned key-value store" as used herein are intended to be broadly construed.

Aspects of the present invention provide parallel storage systems with a burst buffer appliance for storage of a partitioned key-value store across a plurality of storage tiers. While the exemplary embodiments of the present invention employ MDHIM, other MPI-Linked partitioned data stores can be employed, as would be apparent to a person of ordinary skill in the art.

According to one aspect of the invention, a burst buffer appliance is provided in a partitioned key-value store. As discussed further below, the burst buffer appliance is configured to store key-value data on first and second storage tiers comprising respective disjoint subsets of storage. In this manner, the burst buffer appliance provides access to an expanded storage footprint, including multi-tier key-value storage.

According to another aspect of the invention, one or more servers in the disclosed partitioned key-value store provide an interface between one or more local key-value stores and one or more additional storage architectures. In addition, one or more servers in the disclosed partitioned key-value store optionally provide a key value interface that provides access to at least one hardware key-value store.

According to a further aspect of the invention, the local key-values are optionally sorted both locally by the local store and globally by the overall MDHIM framework. Another aspect of the invention leverages the local and global sorting to provide batch input/output (IO) operations that aggregate multiple requests into batch operations on one or more sorted ranges. In this manner, desired data can be obtained using a reduced number of messages over the network.

FIG. 1 illustrates an exemplary partitioned key-value store 100 incorporating aspects of the invention. As shown in FIG. 1, the exemplary partitioned key-value store 100 comprises an exemplary application, such as application 110, that can read, write and/or query key-value data in the exemplary partitioned key-value store 100, using one or more MDHIM clients, such as the exemplary MDHIM client 120. One or more MDHIM servers, such as MDHIM server 130, control the storage of key-value data using a key-value abstraction layer 140 and a local key-value store 150 on a compute node 160 in a high performance computing (HPC) environment, in a known manner. Generally, the local key-value store 150 processes key-value operations such as leveldb or pblisam.

An exemplary architecture for an MDHIM partitioned key-value store is discussed further below in conjunction with FIG. 3. For a more detailed discussion of MDHIM, see, for example, James Nunez et al., "Multidimensional Data Hashing Indexing Metadata/Middleware (MDHIM) Project," Ultrascale Systems Research Center, High Performance Computing Systems Integration (2012-2013), incorporated by reference herein.

As indicated above, one aspect of the invention provides a burst buffer appliance 190 in the partitioned key-value store 100. As discussed further below, the burst buffer appliance is configured to store key-value data on first and second storage tiers comprising respective disjoint subsets of storage. In this manner, the burst buffer appliance provides access to an expanded storage footprint, including multi-tier key-value storage.

As shown in FIG. 1, the exemplary burst buffer appliance 190 comprises parallel log structured file system (PLFS) burst buffer software 170 that provides access to an exemplary flash storage tier 180 and an exemplary disk storage tier 195. The exemplary flash storage tier 180 may be integrated within the burst buffer appliance 190 or an external storage device. The parallel log structured file system (PLFS) may be based on, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein.

As shown in FIG. 1, the exemplary burst buffer appliance 190 is configured to process tiering commands from the MDHIM server 130 on compute node 160, as well as read and write commands from the local key value store 150 on compute node 160.

The burst buffer appliance 190 is configured to communicate with clients, object storage servers and MDHIM servers 130 over a network. The burst buffer appliance 190 in the present embodiment is assumed to comprise a flash memory or other high-speed memory having a substantially lower access time than the disk storage tier 195. The burst buffer appliance 190 may optionally comprise an analytics engine, and may include other components.

Although flash memory will often be used for the high-speed memory of the burst buffer appliance 190, other types of low-latency memory could be used instead of flash memory. Typically, such low-latency memories comprise electronic memories, which may be implemented using non-volatile memories, volatile memories or combinations of non-volatile and volatile memories. Accordingly, the term "burst buffer appliance" as used herein is intended to be broadly construed, so as to encompass any network appliance or other arrangement of hardware and associated software or firmware that collectively provides a high-speed memory and optionally an analytics engine to control access to the high-speed memory. Thus, such an appliance includes a high-speed memory that may be viewed as serving as a buffer between a computer system comprising clients executing on compute nodes (not shown) and a file system such as storage tiers 180, 195, for storing bursts of data associated with different types of TO operations.

The burst buffer appliance 190 further comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination.

The memory and other memories disclosed herein may be viewed as examples of what are more generally referred to as "computer program products" storing executable computer program code.

Also included in the burst buffer appliance is network interface circuitry. The network interface circuitry allows the burst buffer appliance to communicate over the network with other devices. The network interface circuitry may comprise, for example, one or more conventional transceivers.

The storage tiering functionality of the burst buffer appliance 190 may be implemented at least in part in the form of software that is stored in memory and executed by a processor.

The burst buffer appliance 190 comprising processor, memory and network interface components as described above is an example of what is more generally referred to herein as a "processing device." Each of the devices herein may similarly be implemented as a processing device comprising processor, memory and network interface components.

Although only a single burst buffer appliance 190 is shown in the FIG. 1 embodiment, a given partitioned key-value store in other embodiments may comprise multiple burst buffer appliances 190.

The exemplary flash storage tier 180 and exemplary disk storage tier 195 in the present embodiment are arranged into first and second storage tiers, also denoted as Storage Tier 1 and Storage Tier 2, although it is to be appreciated that more than two storage tiers may be used in other embodiments. Each of the exemplary flash storage tier 180 and exemplary disk storage tier 195 may be viewed as being representative of an object storage target of a corresponding object storage server. The first and second storage tiers comprise respective disjoint subsets of the object storage servers.

The different storage tiers 180 and 195 in this embodiment comprise different types of storage devices having different performance characteristics. The flash storage devices of the storage tier 180 are generally significantly faster in terms of read and write access times than the disk storage devices of the storage tier 195. The flash storage devices are therefore considered "fast" devices in this embodiment relative to the "slow" disk storage devices. Accordingly, the exemplary partitioned key-value store 100 may be characterized in the present embodiment as having a "fast" storage tier 180 and a "slow" storage tier 195, where "fast" and "slow" in this context are relative terms and not intended to denote any particular absolute performance level. These storage tiers comprise respective disjoint subsets of object storage servers and their associated object storage targets. However, numerous alternative tiering arrangements may be used, including three or more tiers each providing a different level of performance. The particular storage devices used in a given storage tier may be varied in other embodiments and multiple distinct storage device types may be used within a single storage tier.

The flash storage devices in the exemplary flash storage tier 180 may be implemented, by way of example, using respective flash Peripheral Component Interconnect Express (PCIe) cards or other types of memory cards installed in a computer or other processing device that implements the corresponding object storage server. Numerous alternative arrangements are possible. Also, a variety of other types of non-volatile or volatile memory in any combination may be used to implement at least a portion of the storage devices. Examples of alternatives to flash storage devices that may be used as respective object storage targets in other embodiments of the invention include non-volatile memories such as magnetic random access memory (MRAM) and phase change random access memory (PC-RAM).

The flash storage devices of the exemplary flash storage tier 180 generally provide higher performance than the disk storage devices but the disk storage devices of the disk storage tier 195 generally provide higher capacity at lower cost than the flash storage devices. The exemplary tiering arrangement of FIG. 1 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the exemplary partitioned key-value store 100, leading to enhanced system performance relative to conventional arrangements, while additionally or alternatively providing an ability to achieve particular levels of performance at lower cost.

The embodiment of FIG. 1 provides an MDHIM partitioned key-value store with tiered storage where the MDHIM server 130 executes on a compute node 160. The exemplary MDHIM server 130 can be implemented in a conventional manner, and be unaware of tiering provided by the burst buffer appliance 190 and transparently benefit from the improved performance. In another variation, the MDHIM server 130 can be burst buffer aware and interface to the application programming interface (API) of the burst buffer appliance 190 to help make intelligent tiering decisions using one or more tiering commands, as shown in FIG. 1.

Figure 2:
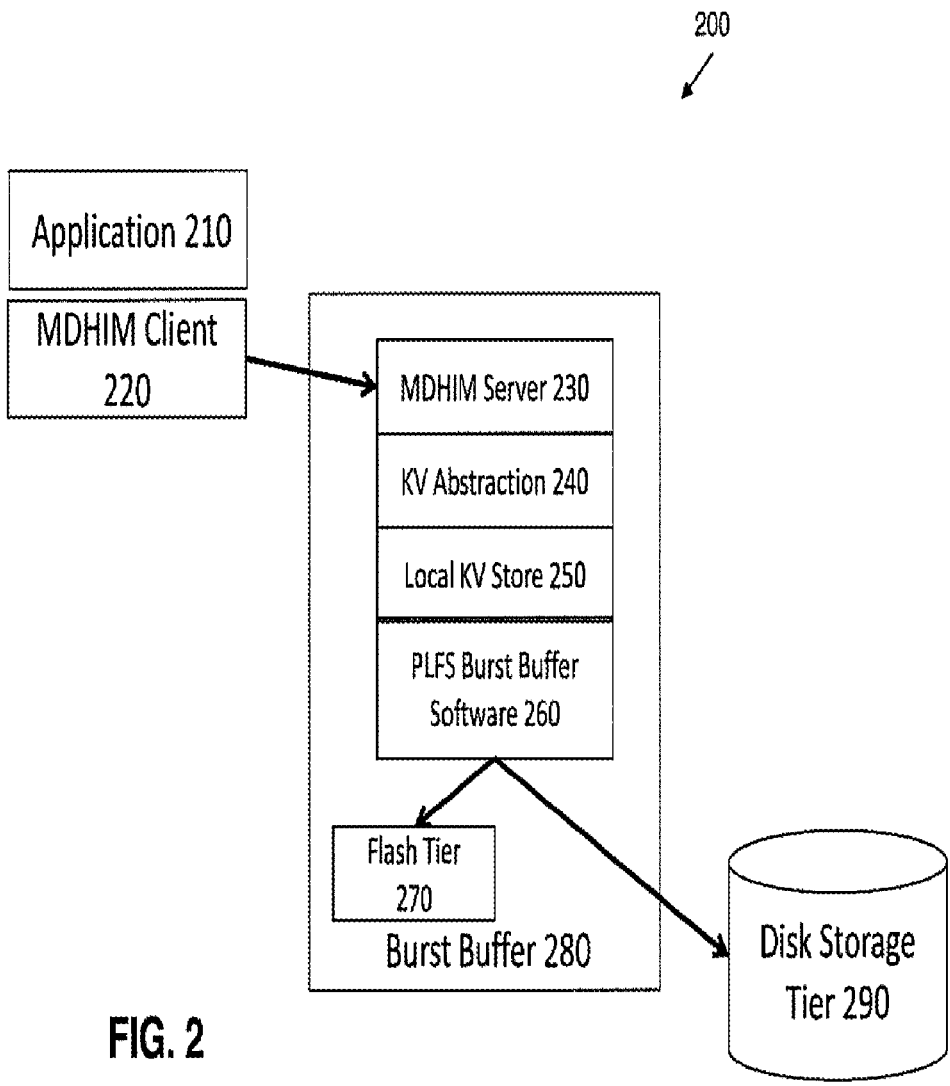
FIG. 2 illustrates an exemplary alternate partitioned key-value store incorporating aspects of the invention.

FIG. 2 illustrates an exemplary alternate partitioned key-value store 200 incorporating aspects of the invention. Generally, in the embodiment of FIG. 2, the MDHIM server 230 executes on the burst buffer appliance 280. In this manner, MDHIM can be implemented in a high performance computing (HPC) environment in which the compute nodes 160 do not provide storage. In addition, when the MDHIM servers 230 execute on the burst buffer appliance 280, processing resources on the compute nodes 160 are not consumed by the MDHIM servers 230.

As shown in FIG. 2, the exemplary partitioned key-value store 200 comprises an exemplary application, such as application 210, that can read, write and/or query key-value data in the exemplary partitioned key-value store 200, using one or more MDHIM clients, such as the exemplary MDHIM client 220, in a similar manner to FIG. 1. One or more MDHIM servers, such as MDHIM server 230 executing on the burst buffer appliance 280, control the storage of key-value data using a key-value abstraction layer 240 and a local key-value store 250.

The exemplary burst buffer appliance 280 further comprises the PLFS burst buffer software 260 that provides access to an exemplary flash storage tier 270 and an exemplary disk storage tier 290, in a similar manner to FIG. 1. The exemplary flash storage tier 270 may be integrated within the burst buffer appliance 280, as shown in FIG. 2, or an external storage device.

Figure 3:
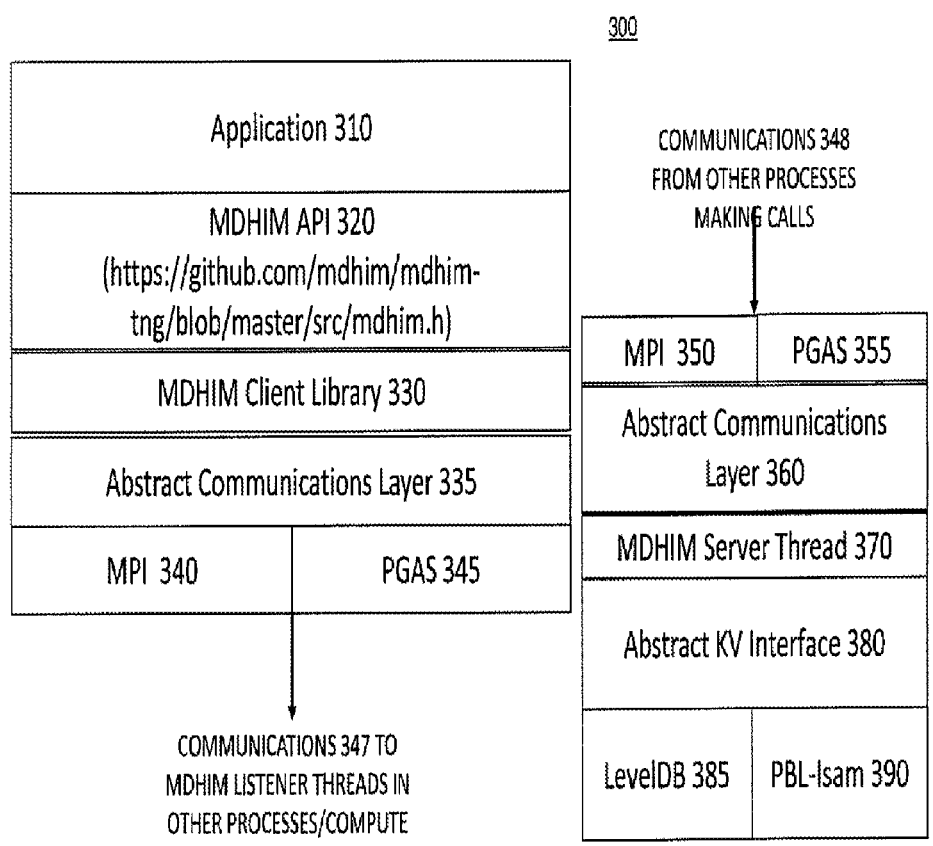
FIG. 3 illustrates an exemplary conventional architecture and application programming interface (API) for an MDHIM partitioned key-value store.

FIG. 3 illustrates an exemplary conventional architecture and application programming interface (API) for an MDHIM partitioned key-value store. Generally, an MDHIM framework employs one process address space, with the original process and the MDHIM listener thread in the same process space after the call to mdhim_init( ) which caused the MDHIM Listener thread to be spawned. Users run an MPI job and call mdhim_init( ) on every process/thread/MPI rank/compute node where an MDHIM server is desired.

MDHIM then spawns a listener thread to receive MDHIM communications 348 from other processes making calls to mdhim such as mdhim_get or mdhim_put. As discussed further below, subsequent calls to mdhim (such as mdhim_put or mdhim_get) then create an MPI unexpected message which is sent to one of the MDHIM servers. MDHIM can run as client/server where each compute node is running both an MDHIM client and an MDHIM server.

MDHIM communications 348 from other processes are processed in a first layer comprising the Message Passing Interface (MPI) 350 or PGAS 355, followed by an abstract communications layer 360, MDHIM Server Thread 370, abstract key-value interface 380 and key-value operations such as leveldb 385 and Pbl-Isam 390, in a known manner.

Communications 347 to MDHIM Listener threads running in other processes/compute nodes are generated by an application 310 that provides messages to an MDHIM application programming interface (API) 320 using an MDHIM client library 330 and an abstract communications layer 335. Communications 347 are sent to other processes using the Message Passing Interface (MPI) 340 or PGAS 345.

The MDHIM application programming interface (API) 320 comprises the following exemplary operations:
- MDHIM init—initializes MDHIM structures and creates range server threads.
- MDHIM_PUT—put one or more keys in a data store
- MDHIM_GET—get one or more keys from the data store
- MDHIM insert—a list function that inserts new records with key and record data
- MDHIM flush—makes key distribution information available to MDHIM clients
- MDHIM find—find a record using primary key (match, best higher or lower) and
- set the absolute record number.
- MDHIM close—close an MDHIM file
- MDHIM read—a list function that read records (key and data), using absolute record numbers For a more detailed discussion of MDHIM, see, for example, James Nunez et al., "Multidimensional Data Hashing Indexing Metadata/Middleware (MDHIM) Project," Ultrascale Systems Research Center, High Performance Computing Systems Integration (2012-2013), incorporated by reference herein.

As previously indicated, an aspect of the invention sorts the local key-values locally by the local store and globally by the overall MDHIM framework. The local and global sorting can be leveraged to provide batch input/output (IO) operations that aggregate multiple requests into batch operations on one or more sorted ranges. In this manner, desired data can be obtained using a reduced number of messages over the network. For a more detailed discussion of key sorting techniques, see, for example, United States patent application entitled "Partitioned Key-Value Store With One-Sided Communications for Secondary Global Key Lookup by Range-Knowledgeable Clients," filed contemporaneously herewith and incorporated by reference herein.

Aspects of the present invention thus recognize that HPC applications typically will access contiguous sets of keys in parallel. Therefore, one process in an HPC job will access one sorted range and another will access a different sorted range. The global sort allows a better storage access pattern where each process only queries from a small set of the range server nodes. In addition, the local sort allows individual key requests to result in fewer storage operations.

Figure 4:
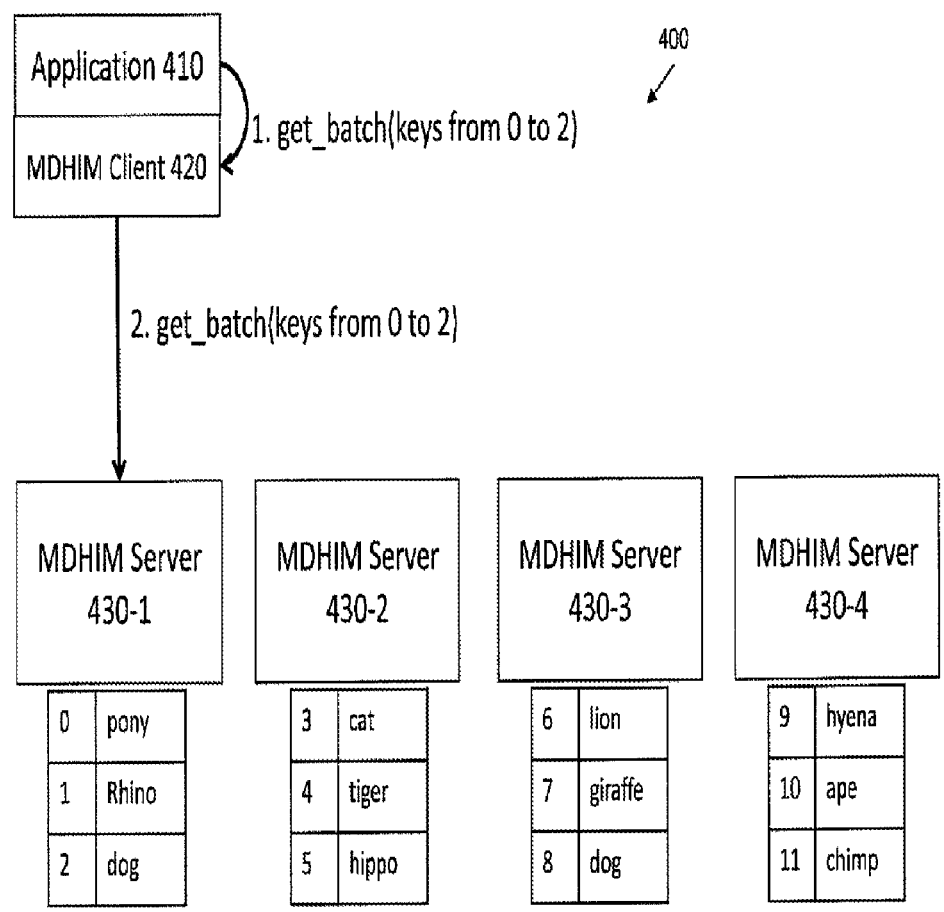
FIG. 4 illustrates the processing of a batch operation in an exemplary partitioned key-value store incorporating global sorting aspects of the invention.

FIG. 4 illustrates the processing of a batch operation in an exemplary partitioned key-value store 400 incorporating global sorting aspects of the invention. As shown in FIG. 4, the exemplary partitioned key-value store 400 comprises an exemplary application 410 that can read, write and/or query key-value data in the exemplary partitioned key-value store 400, using one or more MDHIM clients, such as the exemplary MDHIM client 420. One or more MDHIM servers 430-1 through 430-N (N is equal to 4 in the exemplary embodiment of FIG. 4) control the storage of key-value data.

The exemplary application 410 initially issues an aggregated "get batch" request to the client 420 during a first step, as follows:
  get_batch(keys from 0 to 2)

The range-knowledgeable client 420 knows the keys in the range of 0-2 are stored by the first MDHIM server 430-1 and sends the get batch request to the appropriate server 430-1 during a second step, as follows:
  get_batch(keys from 0 to 2)

In this manner, multiple requests are aggregated into "batches" to send fewer messages over the network.

Without a global sort, even if the application knows that it wants a sorted batch of keys, the MDHIM client must break this into multiple small individual requests to a large number of servers. The global sort provided by the present invention allows the single requests from the application 410 to the client 420 to become a single request over the network between one client 420 and one server 430-1.

Figure 5:
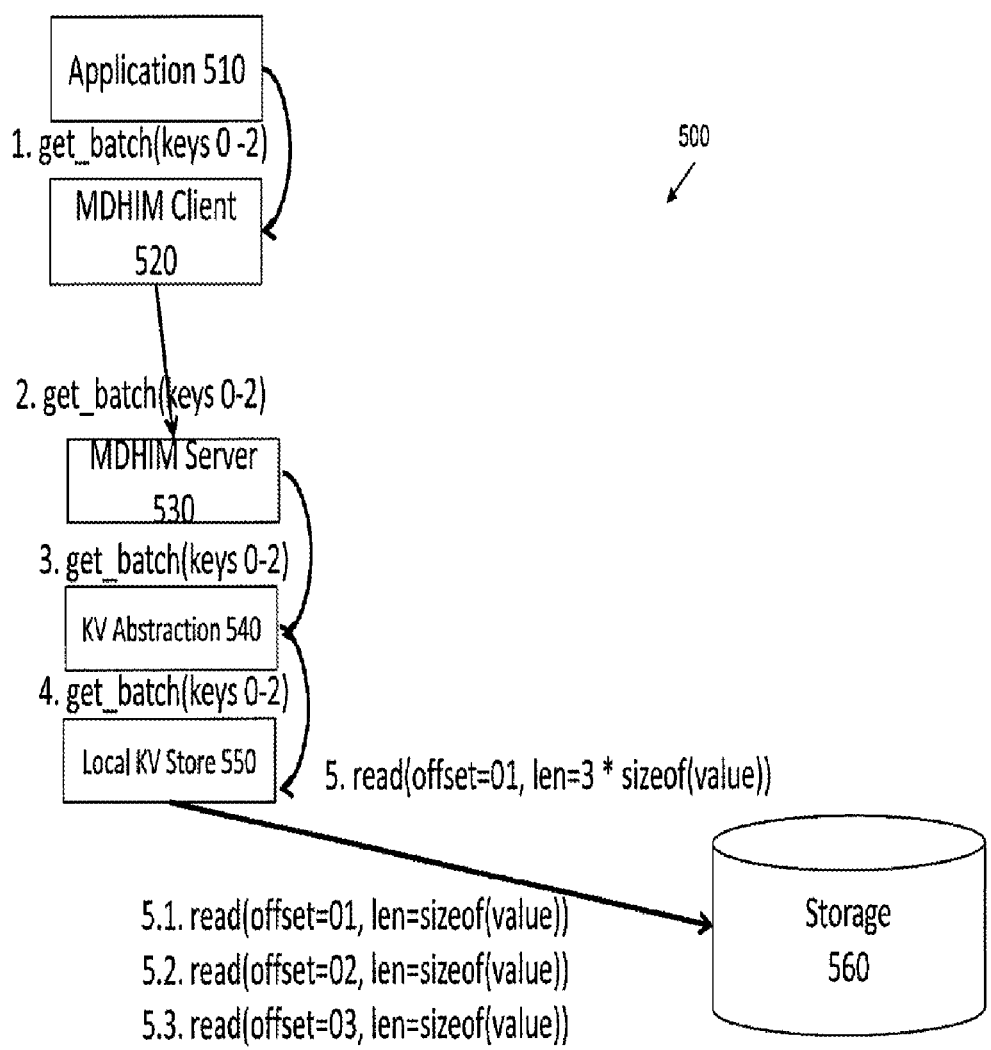
FIG. 5 illustrates the processing of another batch operation in an exemplary partitioned key-value store incorporating local sorting aspects of the invention.

FIG. 5 illustrates the processing of another batch operation in an exemplary partitioned key-value store 500 incorporating local sorting aspects of the invention. As shown in FIG. 5, the exemplary partitioned key-value store 500 comprises an exemplary application 510 that can read, write and/or query key-value data in the exemplary partitioned key-value store 500, using one or more MDHIM clients, such as the exemplary MDHIM client 520. One or more MDHIM servers, such as MDHIM server 530, control the storage of key-value data.

The exemplary application 510 initially issues an aggregated "get batch" request to the client 520 during a first step, as follows:
  get_batch(keys from 0 to 2)

The range-knowledgeable client 520 knows the keys in the range of 0-2 are stored by the MDHIM server 530 and sends the get batch request to the appropriate server 530 during a second step, as follows:
  get_batch(keys from 0 to 2)

The range-knowledgeable client 520 employs a key-value abstraction 540 and a local key-value store 550 to access the key-value data. The MDHIM server 530 stores the logical table but physically the local key-value store 550 is storing the data for this logical table on a storage device 560, such as a disk. According to one aspect of the invention, the local key-value stores 550 are internally sorted so that the local KV store 550 will issue fewer requests to the storage device 560. When the local key-value store 550 does not store sorted key-values, the following requests are issued during step 5:
  5.1. read(offset=01, len=sizeof(value))
  5.2. read(offset=02, len=sizeof(value))
  5.3. read(offset=03, len=sizeof(value))

Thus, there are 3 random reads to the actual storage device 560 with conventional techniques.

When a sorted local key-value store 550 is used in accordance with the present invention, only the following single request is issued during step 5:
  5. read(offset=01, len=3*sizeof(value))

Figure 6:
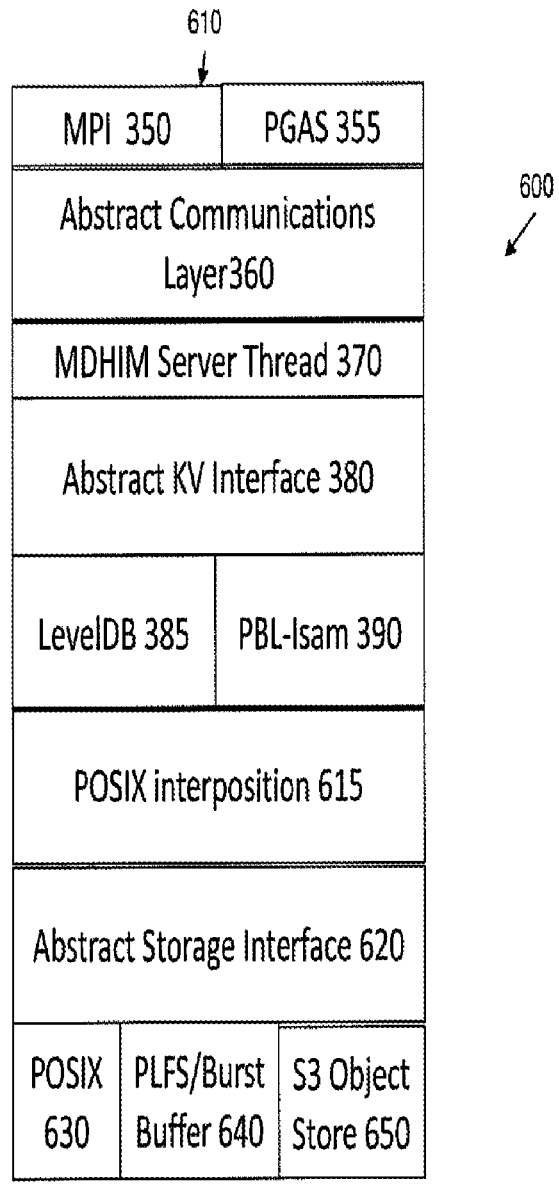
FIG. 6 illustrates the MDHIM layers for processing communications from other processes making calls in accordance with a storage architecture interface aspect of the invention.

FIG. 6 illustrates the MDHIM layers 600 for processing communications 610 from other processes making calls in accordance with a storage architecture interface aspect of the invention. As discussed above in conjunction with FIG. 3, MDHIM spawns a listener thread to receive MDHIM communications 610 from other processes making calls to mdhim such as mdhim_get or mdhim_put. MDHIM communications 610 from other processes are processed in a first layer comprising the Message Passing Interface (MPI) 350 or PGAS 355, followed by an abstract communications layer 360, MDHIM Server Thread 370, abstract key-value interface 380 and key-value operations such as leveldb 385 and Pbl-Isam 390, in a similar manner to FIG. 3.

A Portable Operating System Interface (POSIX) is a family of IEEE standards for maintaining compatibility between operating systems. POSIX defines the application programming interface (API), along with command line shells and utility interfaces, for software compatibility with variants of Unix and other operating systems. Thus, a POSIX interposition 615 layer is provided below key-value operations such as leveldb 385 and Pbl-Isam 390, followed by an abstract storage interface 620. The abstract storage interface 620 allows the existing framework to run in a variety of environments such as POSIX 630, and to leverage additional storage architectures, such as PLFS/Burst Buffer 640 and emerging object stores, such as S3 Object Store 650. The abstract storage interface 620 performs the necessary conversions/translations to leverage a burst buffer and object stores.

In this manner, one or more servers in the disclosed partitioned key-value store provide an interface between one or more local key-value stores and one or more additional storage architectures. In addition, one or more servers in the disclosed partitioned key-value store optionally provide a key value interface that provides access to at least one hardware key-value store.

Figure 7:
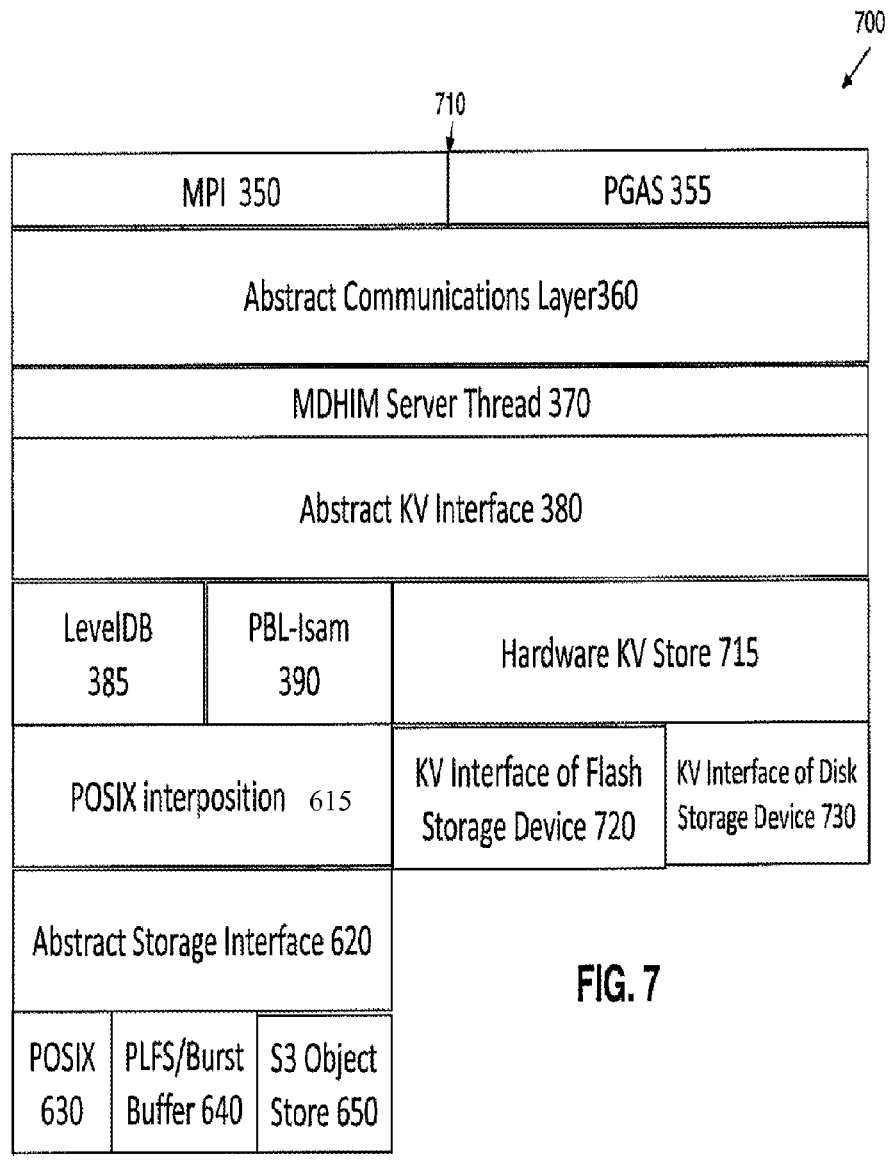
FIG. 7 illustrates the MDHIM layers for processing communications 710 from other processes making calls in accordance with a hardware key-value store interface aspect of the invention.

FIG. 7 illustrates the MDHIM layers 700 for processing communications 710 from other processes making calls in accordance with a hardware key-value store interface aspect of the invention. As discussed above in conjunction with FIG. 3, MDHIM spawns a listener thread to receive MDHIM communications 610 from other processes making calls to mdhim such as mdhim_get or mdhim_put. MDHIM communications 610 from other processes are processed in a first layer comprising the Message Passing Interface (MPI) 350 or PGAS 355, followed by an abstract communications layer 360, MDHIM Server Thread 370, abstract key-value interface 380 and key-value operations such as leveldb 385 and Pbl-Isam 390, in a similar manner to FIG. 3.

In addition, a POSIX interposition 615 layer is provided below key-value operations such as leveldb 385 and Pbl-Isam 390, followed by an abstract storage interface 620. The abstract storage interface 620 allows the existing framework to run in a variety of environments such as POSIX 630, and to leverage additional storage architectures, such as PLFS/Burst Buffer 640 and emerging object stores, such as S3 Object Store 650, in a similar manner to FIG. 6.

The Abstract KV Interface 380 also provides an interface to a hardware key-value Store 715, connected to a key-value interface 720 of a flash storage device and/or a key-value interface 730 of a disk storage device.

It is to be appreciated that the particular operations and associated messaging illustrated herein are exemplary only, and numerous other types of operations and messaging may be used in other embodiments.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the partitioned key-value stores of the present invention. Such components can communicate with other elements of the partitioned key-value store over any type of network or other communication media.

As indicated previously, components of a partitioned key-value store 100 and burst buffer appliance 190 as disclosed herein can be implemented at least in part in the form of one or more software programs stored in memory and executed by a processor of a processing device. A memory having such program code embodied therein is an example of what is more generally referred to herein as a "computer program product."

The partitioned key-value store 100, burst buffer appliance 190 or portions thereof may be implemented using one or more processing platforms each comprising a plurality of processing devices. Each such processing device may comprise processor, memory and/or network interface components.

As indicated above, multi-tier storage of key-value data such as that described herein can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of partitioned key-value stores and associated clients, servers and other processing devices that can benefit from the secondary global key look-up functionality as described herein. Also, the particular configurations of system and device elements shown in FIGS. 1 and 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

Distributed MetaData

In many embodiments, a HPC environment include burst buffer appliances may enable a HPC environment to manage data storage and associated metadata in a distributed manner. In various embodiments, a burst buffer appliance may include a data management module coupled with a distributed Key-Value (KV) store which may enable the data management module to manage, create, distribute and/or retrieve efficiently metadata which may be distributed through a HPC environment. In certain embodiments, a HPC environment may use MDHIM as its distributed Key-Value (KV) store. In some embodiments, a data management module may enable a HPC Environment to separate metadata tables for objects, containers, transactions, and other metadata created within the HPC Environment. In many embodiments, MDHIM may enable sharding for metadata (i.e. object, containers, transactions, and/or other metadata). In certain embodiments, metadata may be split into two or more key spaces of equally sized ranges and may be distributed to two or more MDHIM servers. In various embodiments, splitting metadata among two or more key space may enable processing of smaller metadata stores, which in term may enable more efficient management, storage, distribution and/or retrieval of metadata from a KV store. In certain embodiments, a HPC environment may have a uniform load-balanced distribution of metadata across MDHIM servers. In many embodiments, sharding for metadata may create a large number of small ranges such that each server may server many ranges. In various embodiments, sharding of metadata may be dynamically rearranged to fix poorly balanced distributions.

Figure 8:
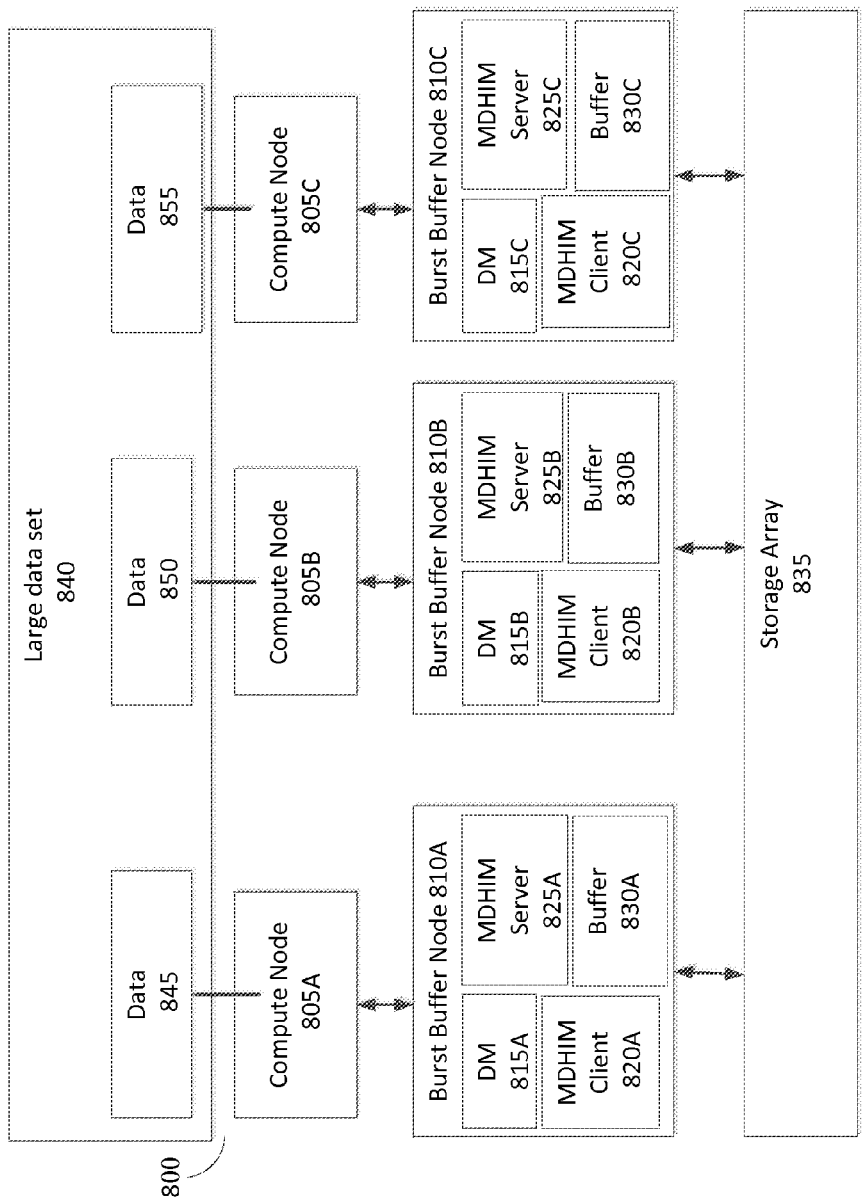
FIG. 8 is a simplified illustration of a High Performance Computing (HPC) Environment, in accordance with an embodiment of the current disclosure.

Refer to the example embodiment of FIG. 8. FIG. 8 is a simplified illustration of a High Performance Computing (HPC) Environment, in accordance with an embodiment of the current disclosure. HPC Environment 800 includes compute node (805A-C, 805 generally), burst buffer node (810A-C, 810 generally), and data storage array. Burst buffer node 810A includes data management module 815A, MDHIM client 820A, MDHIM Server 825A, and Flash Buffer 830A. Burst buffer node 810B includes data management module 815B, MDHIM client 820B, MDHIM Server 825B, and Flash Buffer 830B. Burst buffer node 810C includes data management module 815C, MDHIM client 820C, MDHIM Server 825C, and Flash Buffer 830C. Compute Node 805A is in communication with Burst Buffer node 810A, which is in communication with Data storage Array 835. Compute Node 805B is in communication with Burst Buffer node 810B, which is in communication with Data storage Array 835. Compute Node 805C is in communication with Burst Buffer node 810C, which is in communication with Data storage Array 835.

In this embodiment, large data set 840 is divided into smaller portions to enable more efficient processing by each compute node 805. As shown, data 845 is processed on compute node 805A. Data 850 is processed on compute node 805B. Data 855 is processed on compute node 805C. Data management modules 815 manage data received from compute node 805. Each burst buffer node 810 includes a MDHIM Server which enables each Burst Buffer Node 810 to manage a portion of metadata associated with data stored on burst buffer node 810 and/or data storage array 835. In this embodiment, each burst buffer node 810 is enabled to communicate with other burst buffer nodes including MDHIM Server 825 to enable creation, deletion, and/or management of metadata stored on each respective burst buffer node 810. For example, in an embodiment, MDHIM Server 825A stores metadata related to objects, MDHIM Server 825B stores metadata related to containers, and MDHIM Server 825C stores metadata related to checkpoints and transactions. In this embodiment, each burst buffer node 810 includes a MDHIM Client (820A-C, 820 generally) enabled to communicate which each respective MDHIM Server (825A-C) to create, delete, retrieve, and/or manage metadata stored in each respective MDHIM Server (825A-C). A request to retrieve object metadata would be sent to MDHIM Server 825. A request to retrieve container metadata would be sent to MDHIM Server 825B. A request to retrieve checkpoint and/or transaction metadata would be sent to MDHIM Server 825C. In FIG. 8, data management module 815 is enabled to communicate with other data management modules to coordinate and/or synchronize data, transactions, checkpoints, and/or events stored at data management module 815.

In various embodiments, a data management module may include a transaction manager module, a container Manager module, and an inter data management communication module to enable distributed asynchronous transactions. In certain embodiments, a transaction manager may be enabled to provide transaction semantics. In other embodiments, a transaction manager may be enabled to manage one or more specific transaction's status, which may be selected by hashing transaction ID. In some embodiments, a transaction's final status may be tracked by a container manager which may be selected by hashing a container path name. In many embodiments, an inter data management communication module may be used for communication between data management modules. In various embodiments, a data management module may have special threads listening for unexpected MPI messages from sibling data management modules, where the MPI messages have pre-defined message formats. In certain embodiments, communication between data management modules may be based on MPI mechanisms.

In some embodiments, data management modules may provide transaction semantics to other layers of a burst buffer, such as, but not all inclusive, atomic writes, concurrent writes, consistent reads, multiple objects, and/or multiple threads. In many embodiments, an atomic write may be defined as allowing all writes in a transaction to be applied or no writes in a transaction to be applied. In various embodiments, concurrent writes may be effectively applied according to Transaction ID order, not time order. In certain embodiments, consistent reads may enable all reads to the HPC environment to access the same version of data even in the presence of concurrent writes. In some embodiments, data management transactions may exist at a container level. In other embodiments, multiple objects may mean that any number of objects within one container may be written in the same transaction. In various embodiments, one or more threads and/or processes may participate in the same transaction.

In many embodiments, Data management modules on burst buffer nodes may be enabled to rebalance metadata storage on MDHIM Servers. In various embodiments, if one or more MDHIM Servers have a higher workload than other MDHIM Servers, the distributed workload may be modified to uniformly distribute a workload over all the MDHIM Servers. In other embodiments, if one or more MDHIM server may be particularly suited for managing a type of metadata (i.e., more processors available, faster hardware) metadata storage and/or workload may be adjusted to have a heavier workload on one or more specified MDHIM servers.

Figure 9:
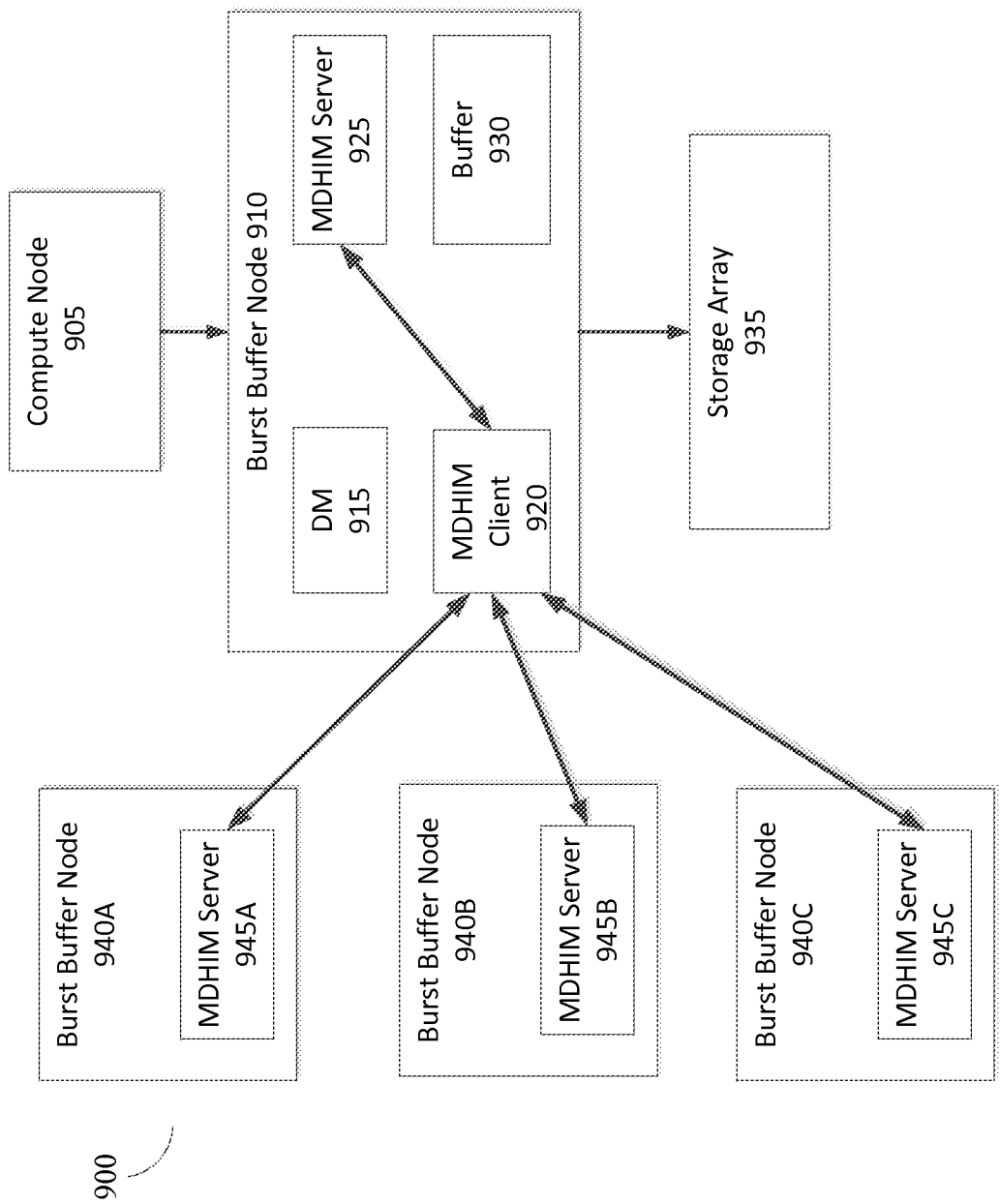
FIG. 9 is a simplified illustration of a HPC environment in a first state, in accordance with an embodiment of the present disclosure.

Refer to the example embodiment of FIG. 9. FIG. 9 is a simplified illustration of a HPC environment in a first state, in accordance with an embodiment of the present disclosure. As shown, HPC environment 900 includes Burst Buffer Node 910, compute node 905, Data storage array 935, burst buffer nodes (940A-C, 940 Generally). For simplicity, burst buffer nodes 940 are shown with only MDHIM Server Modules (945A-C, 945 generally), however, each burst buffer node 940 includes a data management module, MDHIM client, Flash buffer, and is in communication with a data storage array. Burst buffer node 910 includes data management module 915, MDHIM Client module 920, MDHIM Server 925, and flash buffer 930. In this embodiment, data management module 915 is enabled to access metadata of data stored within HPC environment 900 using MDHIM Client module 920. MDHIM client module 920 is in communication with MDHIM server 925, MDHIM Server 945A, MDHIM Server 945B, and MDHIM Server 945C. MDHIM server 925, MDHIM Server 945A, MDHIM Server 945B, and MDHIM Server 945C each are enabled to reference a portion of metadata stored within HPC environment 900.

Figure 10:
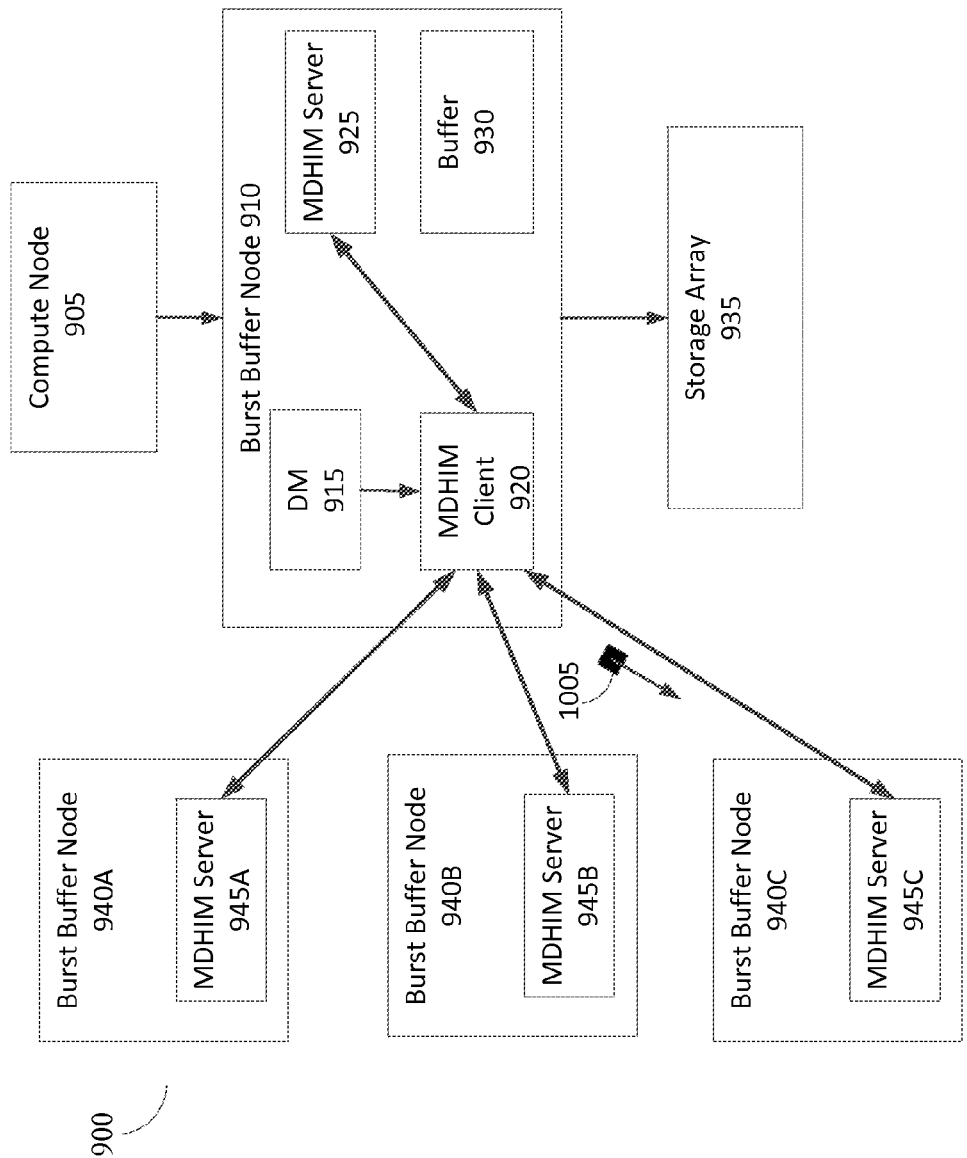
FIG. 10 is a simplified illustration of a HPC environment in a second state, in accordance with an embodiment of the present disclosure.

Refer to the example embodiment of FIG. 10. FIG. 10 is a simplified illustration of a HPC environment in a second state, in accordance with an embodiment of the present disclosure. As shown, MDHIM Client 920 is in communication with MDHIM Server 925, MDHIM Server 945A, MDHIM Server 945B, and MDHIM Server 945C. In this embodiment, Data management module 915 has created metadata related to data being stored and/or managed by burst buffer node 910. Data management 915 utilizes MDHIM Client 920 to update metadata stored within HPC environment 900. In this embodiment, metadata created by Data management module 915 relates to object data stored and/or managed by burst buffer node 910. As shown, MDHIM Server 945C stores metadata related to object data. In FIG. 10, Data management module 915 sends metadata from MDHIM Client 920 to MDHIM Server 945C using message 1005.

Figure 11:
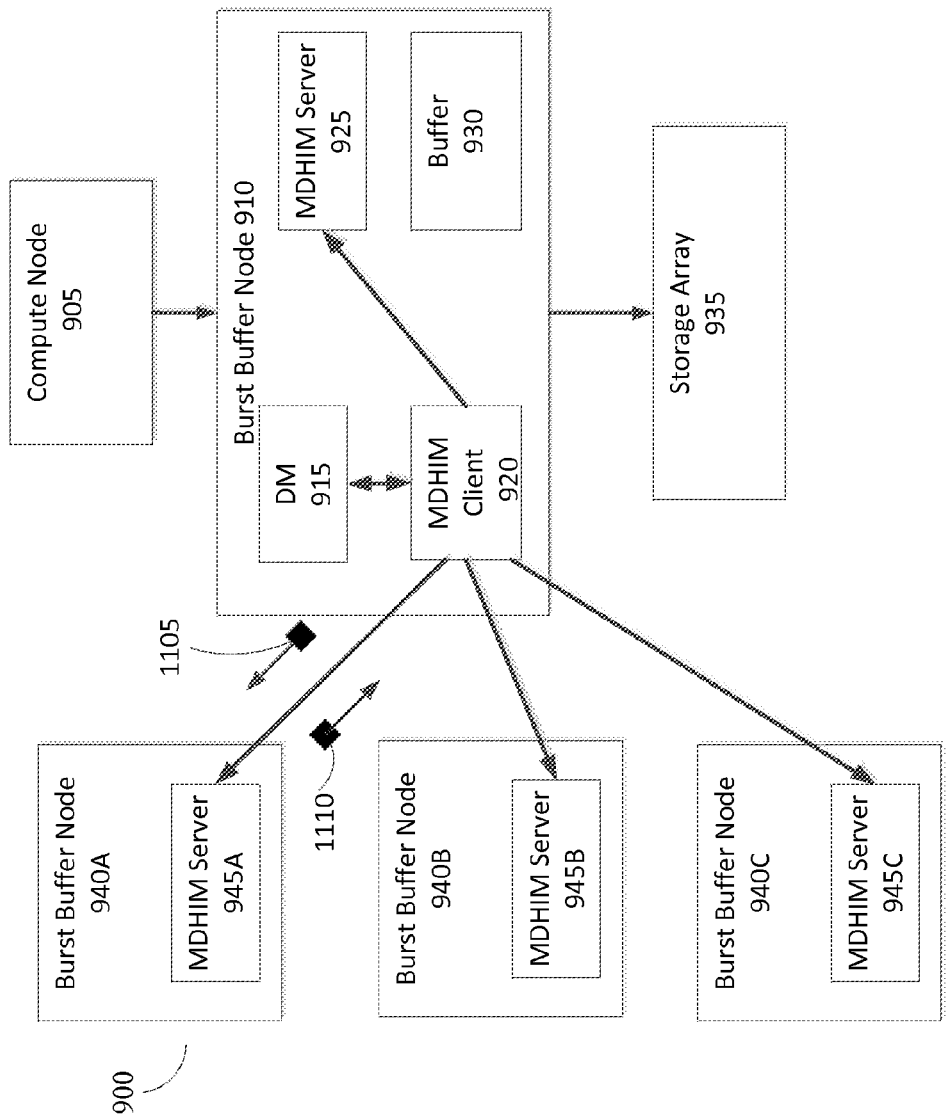
FIG. 11 is a simplified illustration of an HPC environment in a third state, in accordance with an embodiment of the present disclosure.

Refer to the example embodiment of FIG. 11. FIG. 11 is a simplified illustration of an HPC environment in a third state, in accordance with an embodiment of the present disclosure. As shown, MHIM Client 920 is in communication with MDHIM Server 925, MDHIM Server 945A, MDHIM Server 945B, and MDHIM Server 945C. In this embodiment, data management module 915 is retrieving metadata related to a container object stored using burst buffer node 910. Data management module 915 utilizes MDHIM Client 920 to locate and retrieve requested metadata. MDHIM Client 920 determines that the requested metadata is stored on MDHIM Server 945A. MDHIM Client 920 requests metadata using message 1105. MDHIM Server 945A receives the metadata request in message 1105, processes the request, and retrieves the requested metadata. MDHIM Server 945 sends the requested metadata to MDHIM Client 920 using message 1110, which forwards the requested metadata to Data management module 915. In many embodiments, metadata stored within a MDHIM Server module may be physically stored within a buffer on a specified Burst buffer node. In other embodiments, metadata stored within a MDHIM Server module may be physically stored within a data storage array in communication with the MDHIM Server module.

Figure 12:
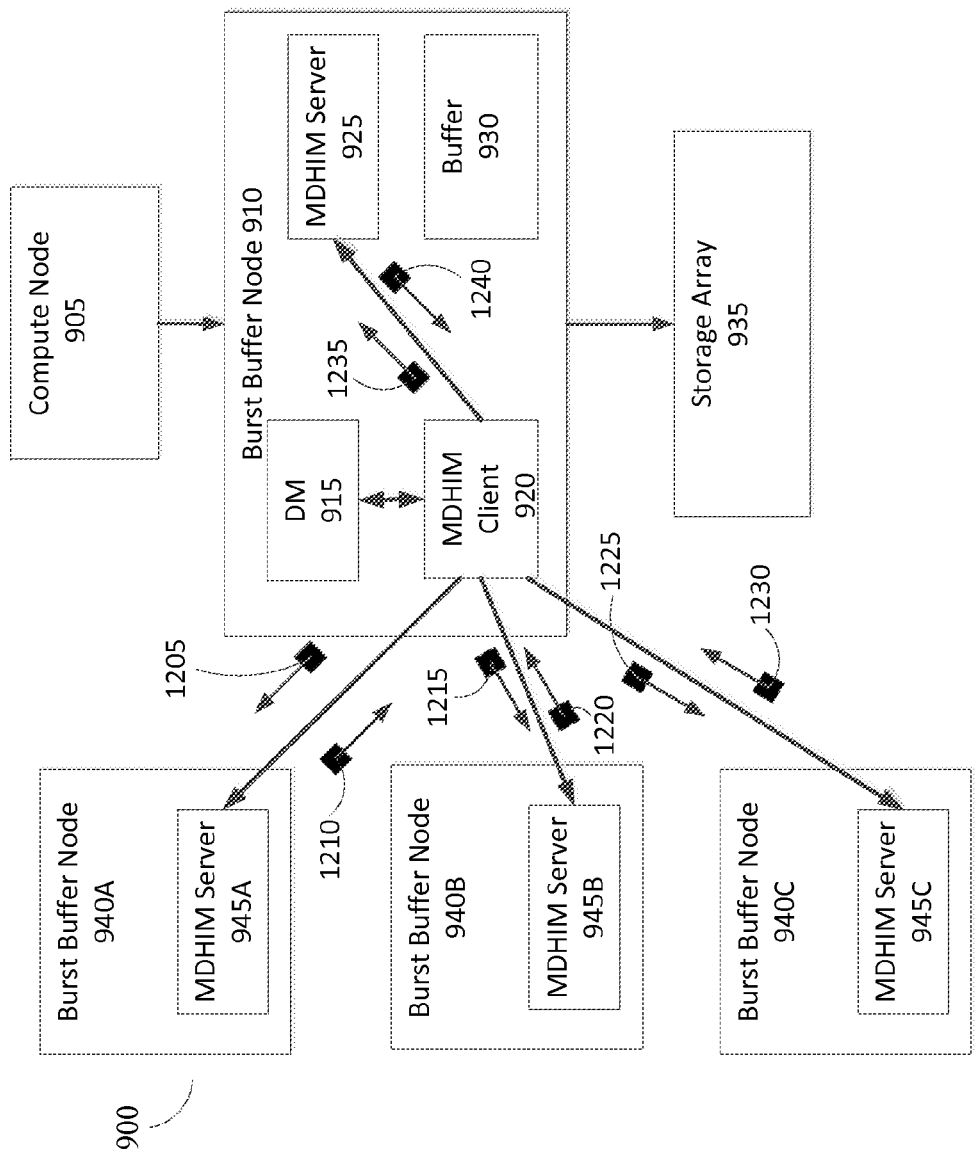
FIG. 12 is a simplified illustration of an HPC environment in a forth state, in accordance with an embodiment of the present disclosure.

Refer to the example embodiment of FIG. 12. FIG. 12 is a simplified illustration of an HPC environment in a forth state, in accordance with an embodiment of the present disclosure. As shown, MHIM Client 920 is in communication with MDHIM Server 925, MDHIM Server 945A, MDHIM Server 945B, and MDHIM Server 945C. In this embodiment, data management module 915 is requesting metadata from each of the MDHIM Servers 945A, 945B, 945C, 925. Data management module 915 utilizes MDHIM client 920 to send metadata request messages 1205, 1215, 1225, 1235. Request messages 1205, 1215, 1225, 1235 requests metadata related to data stored and/or managed data management module 915 on burst buffer node 910. MDHIM Servers 945A-C, 925 process each respective request, retrieve requested metadata and respond using messages 1210, 1220, 1230, 1240. In many embodiments, metadata requests may pertain to a location of data stored in one or more burst buffer nodes within the HPC Environment.

Figure 13:
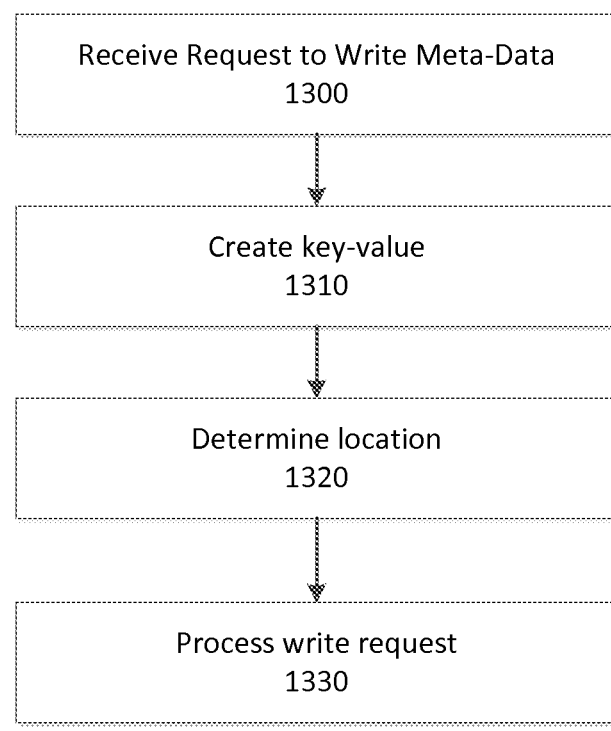
FIG. 13 is a simplified flowchart of a method of managing a metadata write requests in a HPC environment as shown in FIG. 10, in accordance with an embodiment of the present disclosure.

Refer to the example embodiments of FIGS. 10 and 13. FIG. 13 is a simplified flowchart of a method of managing a metadata write requests in a HPC environment as shown in FIG. 10, in accordance with an embodiment of the present disclosure. As shown, MDHIM Client 920 is in communication with MDHIM Server 945A-C and MDHIM Server 925. MDHIM Client 920 receives request to write metadata (Step 1300) from Data management module 915. Data management module 915 created key-value association with the metadata (Step 1310) and send the key-value association and the metadata to MDHIM Client 920 in the request to write metadata. MDHIM client 920 determines which MDHIM Server is appropriate for the created key-value. As shown, MDHIM client 920 determines that MDHIM Server 945C is the appropriate recipient for the key-value (Step 1320). MDHIM Client 920 processes write request (Step 1330) and sends the key-value to MDHIM Server 945C using message 1005.

Figure 14:
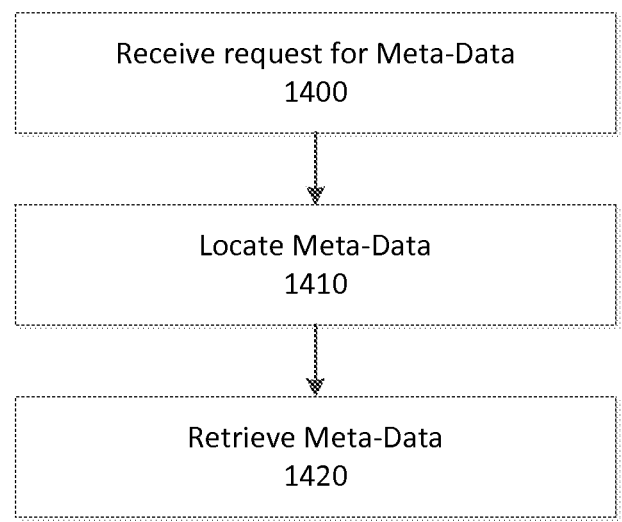
FIG. 14 is a simplified flowchart of a method of managing a metadata read request in a HPC environment as shown in FIG. 11, in accordance with an embodiment of the present disclosure.

Refer to the example embodiment of FIGS. 11 and 14. FIG. 14 is a simplified flowchart of a method of managing a metadata read request in a HPC environment as shown in FIG. 11, in accordance with an embodiment of the present disclosure. As shown, MDHIM Client 920 is in communication with MDHIM Server 945A-C and MDHIM Server 925. MDHIM Client 920 receives request for metadata (Step 1400) from data management module 915, wherein MDHIM Client 920 receives a key associated with the metadata. MDHIM Client 920 processes request and locates meta-data (Step 1410) at MDHIM Server 945A. MDHIM Client 920 sends request message 1105 to MDHIM Server 945A to retrieve requested metadata values (Step 1420). MDHIM Server 945A processes metadata request, retrieves requested metadata from data storage, and responds to the metadata request in message 1110.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 15:
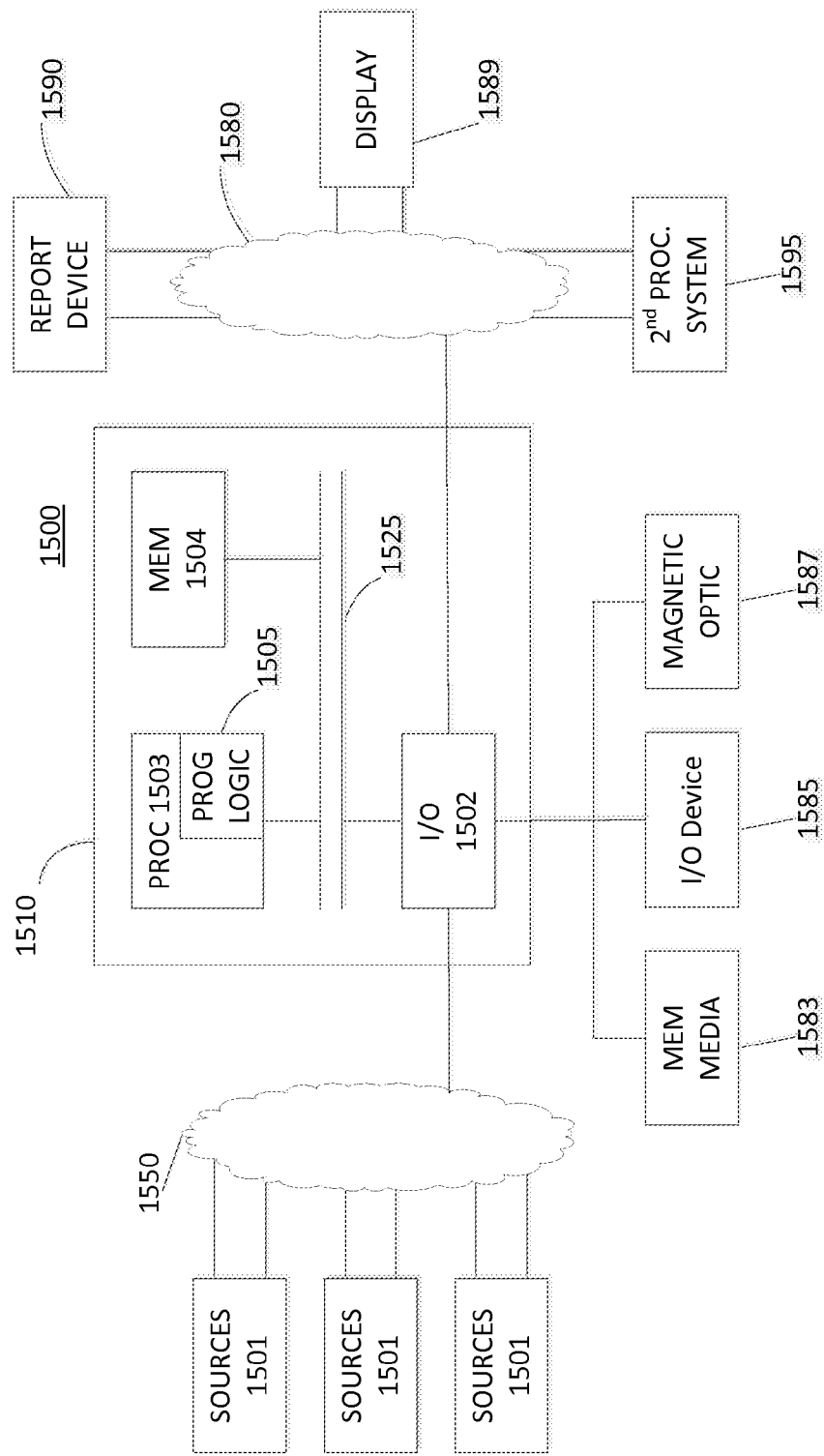
FIG. 15 is an example of an embodiment of an apparatus that may utilize the techniques described herein, in accordance with an embodiment of the present disclosure.

FIG. 15 is a block diagram illustrating an apparatus, such as a computer 1510 in a network 1500, which may utilize the techniques described herein according to an example embodiment of the present invention. The computer 1510 may include one or more I/O ports 1502, a processor 1503, and memory 1504, all of which may be connected by an interconnect 1525, such as a bus. Processor 1503 may include program logic 1505. The I/O port 1502 may provide connectivity to memory media 1583, I/O devices 1585, and drives 1587, such as magnetic or optical drives. When the program code is loaded into memory 704 and executed by the computer 1510, the machine becomes an apparatus for practicing the invention. When implemented on one or more general-purpose processors 1503, the program code combines with such a processor to provide a unique apparatus that operates analogously to specific logic circuits. As such, a general purpose digital machine can be transformed into a special purpose digital machine.

Figure 16:
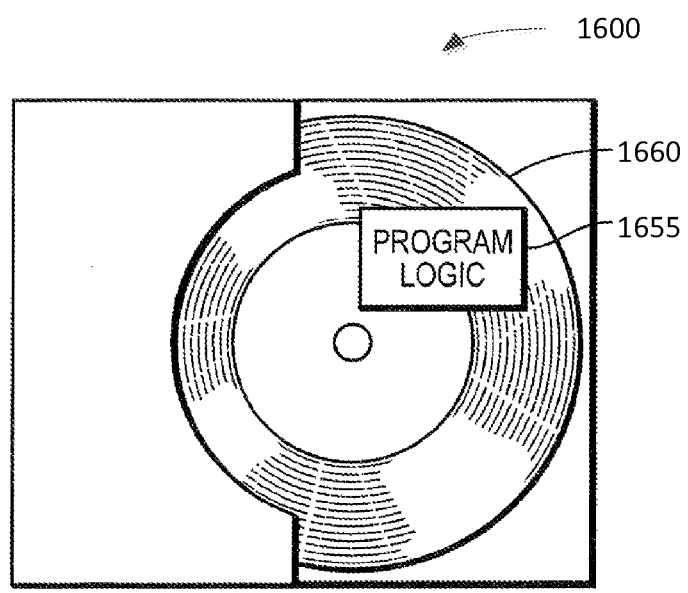
FIG. 16 is an example of a method embodied on a computer readable storage medium that may utilize the techniques described herein, in accordance with an embodiment of the present disclosure.

FIG. 16 is a block diagram illustrating a method embodied on a computer readable storage medium 1660 that may utilize the techniques described herein according to an example embodiment of the present invention. FIG. 16 shows Program Logic 1655 embodied on a computer-readable medium 1660 as shown, and wherein the Logic is encoded in computer-executable code configured for carrying out the methods of this invention and thereby forming a Computer Program Product 1600. Program Logic 1655 may be the same logic 1505 on memory 1504 loaded on processor 1503 in FIG. 15. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-16. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of managing meta-data for a high performance computing (HPC) environment in a distributed storage system, wherein the distributed storage system includes one or more burst buffers enabled to operate with a distributed key-value store and one or more data storage arrays, the computer-executable method comprising:
    receiving a request for meta-data associated with a block of data stored in a first burst buffer of the one or more burst buffers in the distributed storage system, wherein the meta data is associated with a key-value;
    determining which of the one or more burst buffers stores the requested metadata;
    upon determination that a first burst buffer of the one or more burst buffers stores the requested metadata, locating the key-value in a portion of the distributed key-value store accessible from the first burst buffer;
    communicating between each of the one or more burst buffers to manage the distributed key-value store;
    moving data between the one or more burst buffers and the one or more data storage arrays, in the distributed storage system, based on a frequency of use of data;
    wherein the determination enables querying for the metadata in a portion of a total amount of metadata on the distributed key-value store;
    determining a state of the distributed key-value store; and
    based on the state, re-balancing the distributed key-value store.

2. The computer-executable method of claim 1, wherein the distributed key-value store is a Multidimensional Data Hashing Indexing Middleware (MDHIM).

3. The computer-executable method of claim 1, wherein the determining comprises:
    accessing which of the one or more burst buffers stores a range of key-values, wherein the range includes the key-value.

4. A system, comprising:
    a distributed storage system, wherein the distributed storage system includes one or more burst buffers enabled to operate with a distributed key-value store and one or more data storage arrays; and
    computer-executable program logic encoded in memory of one or more computers in communication with the distributed storage system to enable management of metadata for a high performance computing (HPC) environment in the distributed storage system, wherein the computer-executable program logic is configured for the execution of:
        receiving a request for meta-data associated with a block of data stored in a first burst buffer of the one or more burst buffers in the distributed storage system, wherein the meta data is associated with a key-value;
        determining which of the one or more burst buffers stores the requested metadata;
        upon determination that a first burst buffer of the one or more burst buffers stores the requested metadata, locating the key-value in a portion of the distributed key-value store accessible from the first burst buffer;
        communicating between each of the one or more burst buffers to manage the distributed key-value store;
        moving data between the one or more burst buffers and the one or more data storage arrays, in the distributed storage system, based on a frequency of use of data;
        wherein the determination enables querying for the metadata in a portion of a total amount of metadata on the distributed key-value store;
        determining a state of the distributed key-value store; and
        based on the state, re-balancing the distributed key-value store.

5. The system of claim 4, wherein the distributed key-value store is a Multidimensional Data Hashing Indexing Middleware (MDHIM).

6. The system of claim 4, wherein the determining comprises:
    accessing which of the one or more burst buffers stores a range of key-values, wherein the range includes the key-value.

7. A computer program product for managing meta-data for a high performance computing (HPC) environment in a distributed storage system, wherein the distributed storage system includes one or more burst buffers enabled to operate with a distributed key-value store and one or more data storage arrays, the computer program product comprising:
    a non-transitory computer readable medium encoded with computer-executable program code for using read signatures in replication, the code configured to enable the execution of:
        receiving a request for meta-data associated with a block of data stored in a first burst buffer of the one or more burst buffers in the distributed storage system, wherein the meta data is associated with a key-value;
        determining which of the one or more burst buffers stores the requested metadata;
        upon determination that a first burst buffer of the one or more burst buffers stores the requested metadata, locating the key-value in a portion of the distributed key-value store accessible from the first burst buffer;
        communicating between each of the one or more burst buffers to manage the distributed key-value store;
        moving data between the one or more burst buffers and the one or more data storage arrays, in the distributed storage system, based on a frequency of use of data;
        wherein the determination enables querying for the metadata in a portion of a total amount of metadata on the distributed key-value store;
        determining a state of the distributed key-value store; and
        based on the state, re-balancing the distributed key-value store.

8. The computer program product of claim 7, wherein the distributed key-value store is a Multidimensional Data Hashing Indexing Middleware (MDHIM).

9. The computer program product of claim 7, wherein the determining comprises:
    accessing which of the one or more burst buffers stores a range of key-values, wherein the range includes the key-value.

* * * * *